No. 764,554. PATENTED JULY 12, 1904.
C. C. BROWN.
COTTON CHOPPER.
APPLICATION FILED MAY 11, 1904.
NO MODEL.
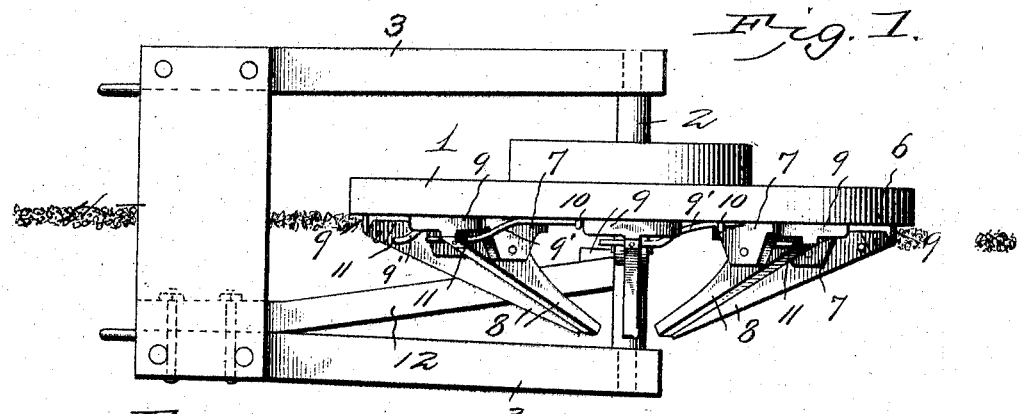
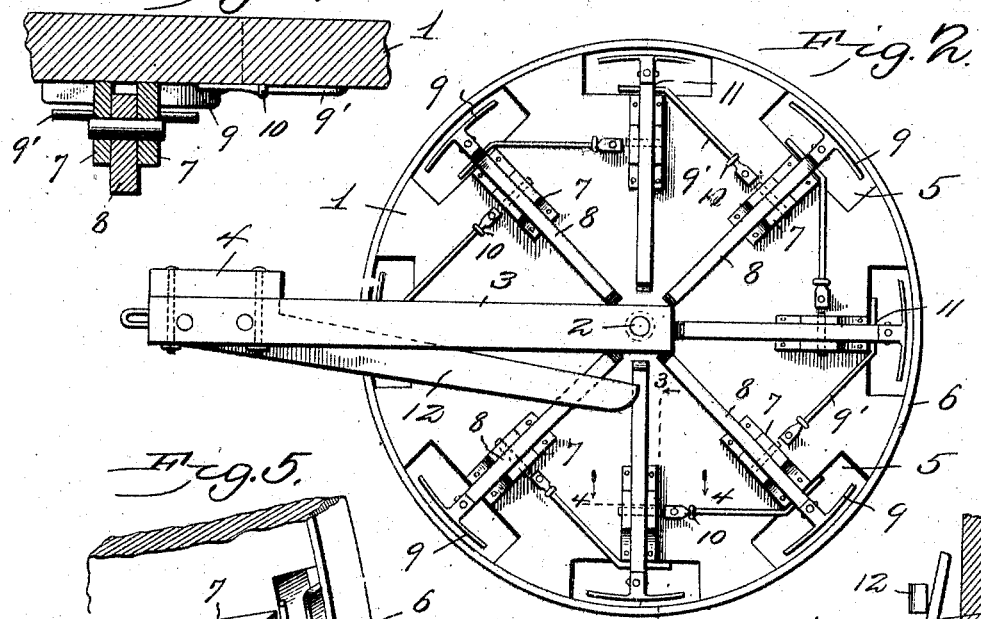
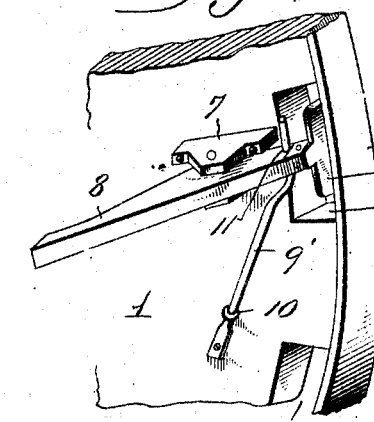
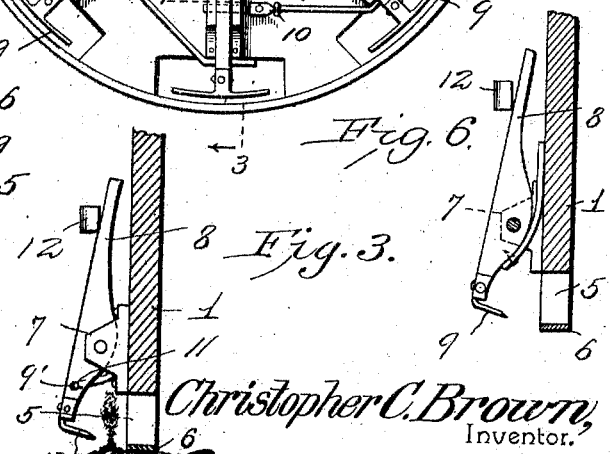
Witnesses
Christopher C. Brown,
Inventor.
Attorneys No. 764,554.

Patented July 12, 1904.

UNITED STATES PATENT OFFICE.

CHRISTOPHER C. BROWN, OF STOUT, TEXAS.

COTTON-CHOPPER.

SPECIFICATION forming part of Letters Patent No. 764,554, dated July 12, 1904.

Application filed May 11, 1904. Serial No. 207,443. (No model.)

*To all whom it may concern:*

Be it known that I, CHRISTOPHER C. BROWN, a citizen of the United States, residing at Stout, in the county of Wood and State of Texas, have invented a new and useful Cotton-Chopper, of which the following is a specification.

This invention relates to that class of devices which are known as "cotton-choppers" and which are used for the purpose of thinning out the rows of young growing plants in such a manner as to leave stands at suitable distances apart.

The invention has for its object to provide a device of this class which shall be simple in construction, durable and efficient in operation, and which may be operated by manual power, if desired, while it may also be hitched to or connected with a draft device or cultivating implement of some kind.

With these ends in view the invention consists in the improved construction and novel arrangement and combination of parts, which will be hereinafter fully described, and particularly pointed out in the claims.

In the accompanying drawings has been illustrated a simple and preferred form of embodiment of the invention, it being understood, however, that no limitation is made to the precise structural details therein exhibited, but that the right is reserved to any changes, alterations, and modifications which may be resorted to within the scope of the invention and without departing from the spirit or sacrificing any of the advantages of the same.

In said drawings, Figure 1 is a top plan view of a cotton-chopper constructed in accordance with the principles of the invention. Fig. 2 is a side elevation of the same. Fig. 3 is a sectional detail view taken on the line 3 3 in Fig. 2. Fig. 4 is a sectional detail view taken on the line 4 4 in Fig. 2. Fig. 5 is a perspective detail view. Fig. 6 is a detail view illustrating a modification.

Corresponding parts in the several figures are indicated by similar numerals of reference.

In the preferred embodiment of my invention is included a wheel or disk 1 of suitable dimensions which is secured upon an axle 2, having bearings in the side pieces 3 3 of a frame, which in addition to said side pieces includes a cross-piece 4, connecting the front ends thereof. The wheel 1 is preferably a solid disk provided at suitable parts of the periphery thereof with recesses 5. Said wheel or disk is also provided with a tire 6, which extends over the recesses 5 and forms an uninterrupted tread or earth-engaging edge for the wheel. The recesses 5 are made of suitable length, which is equal to the distance which it is desired to leave between the stands, and the spaces between said recesses will be equal to the length of the stands.

The inner side of the disk 1 is provided adjacent to the recesses 5 with a plurality of pairs of lugs 7, affording pivotal points for levers 8, the outer ends of which carry hoes 9, which extend through the recesses 5 adjacent to the tire 6 and which are held normally in such position by the action of springs 9', which are firmly secured to the side of the disk by means of clip-bolts 10 or other suitable means, to the free ends of which extend perforations 11 near the outer ends of the levers. The latter will thus be forcibly actuated in such a manner as to carry the hoes into the recesses adjacent to the tire, as already stated, and the springs are to be made of sufficient strength to actuate said levers with sufficient power to enable the purpose of the invention to be carried out, as will be presently more fully described.

To operate the levers 8 against the tension of the springs 9', I provide a cam member 12, which is in the nature of a bar, secured to the under side of and extending rearwardly from the cross-piece 4 at the front end of the frame. This bar or cam member is disposed obliquely, so that as the wheel or disk revolves the levers 8 will successively pass into contact therewith and will be thereby depressed against the tension of the springs 9', thus withdrawing the hoes from their respective recesses until their cutting edges are sufficiently spaced from the inner side of the wheel. As soon as each lever passes out of engagement with the cam member 12 it will be actuated by the spring 9', and the hoe at its outer end will be driven forcibly into the recess 6.

The operation of this invention will be readily understood from the foregoing description, taken in connection with the accompanying drawings. When the device is pulled or dragged over the field, which may be done manually or by suitable power, the frame being, for instance, hitched to the tail end of a cart or to some suitable cultivating implement, the wheel or disk 1 is caused to travel closely adjacent to the row of plants which is to be operated upon. Each of the levers as it moves downwardly in the direction of the row of plants will be actuated by the cam member 12 in such a manner as to withdraw the hoe carried thereby from engagement and from contact with the wheel, thus permitting the plants that are not to be interfered with to pass between the hoe and the side of the wheel. As soon as the lever passes out of engagement with the cam member, which is timed to take place when the free end of the lever is at its lowest point, the said lever is actuated by the spring connected therewith, so as to force the hoe transversely across the row of plants, thus removing the desired portion and throwing them outward to one side through the recess or opening 5. The tire with which the wheel is provided will cause the latter to travel steadily onward, and it may at the same time be caused to coöperate to some extent with the hoes to facilitate the operation of the latter by furnishing resistance, which assists to a great extent the operation of the hoes in removing the plants which it is desired to remove without injury to the adjacent plants.

In Fig. 6 of the drawings has been illustrated a modification of the invention which simply consists in replacing the springs 9', heretofore described, by flat springs 15, which, as shown in Fig. 6, are secured to the inner or under sides of the levers 8 near the hoe-carrying points of said levers by means of bolts 16. The flat springs 15 are extended between the side members of the lugs 7 and will rest freely upon and slide against the adjacent face of the reel or disk 1. When a hook-carrying lever equipped with a spring of this description is actuated by means of the cam member 12, the spring, which is prevented from lateral or side play by the side members of the lugs 7 between which it is placed, will bend around the curved portion or breast 17 upon the under side of the lever and will thus be strained to a considerable degree of tension, whereby as soon as the lever passes out of engagement with the cam member 12 it will be restored to normal position and the hoe at the end of the lever will chop the superfluous plants in precisely the same manner as has been hereinbefore set forth.

Having thus described the invention, what is claimed is—

1. In a device of the class described, a rotary disk provided with recesses at the edge thereof, a tire extending around said disk and forming a tread at the recessed portions thereof, spring-actuated levers connected with the disk and carrying hoes extending through recesses, and means for actuating said levers.

2. In a device of the class described, a disk having peripheral recesses, spring-actuated levers having hoes extending normally into said recesses, and means for operating the levers to gradually withdraw the hoes from the recesses.

3. In a device of the class described, a disk having peripheral recesses and a tire extending over said recesses, lugs upon the said disk, levers connected pivotally with said lugs, hoes at the outer ends of said levers and extending into the recesses, springs disposed to actuate said levers to force the hoes at their outer ends into the recesses, and a cam member disposed in the path of the inner ends of the spring-actuated levers.

4. In a device of the class described, a frame, an axle journaled in said frame, a disk upon said axle having peripheral recesses, a tire extending over said recesses, spring-actuated levers carrying hoes which normally extend into said recesses, and a cam member consisting of an obliquely-disposed bar connected with the front end of the frame and extending rearwardly in the path of the free inner ends of the levers.

In testimony that I claim the foregoing as my own I have hereto affixed my signature in the presence of two witnesses.

CHRISTOPHER C. BROWN.

Witnesses:
S. S. × McCONNELL,
    his mark
J. A. BASS.